(12) United States Patent
Ferguson et al.

(10) Patent No.: US 9,744,881 B2
(45) Date of Patent: Aug. 29, 2017

(54) SYSTEM AND APPARATUS FOR DECOUPLING AN ELECTRO-MECHANICAL ACTUATOR FROM A PORTION OF A LINKAGE

(71) Applicant: AMI Industries, Inc., Colorado Springs, CO (US)

(72) Inventors: Keith M. Ferguson, Colorado Springs, CO (US); Douglas E. Hoover, Colorado Springs, CO (US)

(73) Assignee: AMI Industries, Inc., Colorado Springs, CO (US)

( * ) Notice: Subject to any disclaimer, the term of this patent is extended or adjusted under 35 U.S.C. 154(b) by 107 days.

(21) Appl. No.: 14/467,811

(22) Filed: Aug. 25, 2014

(65) Prior Publication Data

US 2016/0052424 A1    Feb. 25, 2016

(51) Int. Cl.
| | |
|---|---|
| *B60N 2/04* | (2006.01) |
| *B60N 2/02* | (2006.01) |
| *F16H 21/40* | (2006.01) |
| *B61D 33/00* | (2006.01) |
| *H02K 7/06* | (2006.01) |
| *B64D 11/06* | (2006.01) |

(52) U.S. Cl.
CPC ............ *B60N 2/04* (2013.01); *B60N 2/0224* (2013.01); *B60N 2/0228* (2013.01); *B60N 2/0232* (2013.01); *B61D 33/0021* (2013.01); *B64D 11/064* (2014.12); *B64D 11/0643* (2014.12); *B64D 11/06395* (2014.12); *F16H 21/40* (2013.01); *H02K 7/06* (2013.01); *B60N 2002/0236* (2013.01)

(58) Field of Classification Search
CPC ...... B60N 2/04; B60N 2/0224; B60N 2/0228; B60N 2/0232; F16H 21/40; B64D 11/064; B64D 11/06395; B64D 11/0643
See application file for complete search history.

(56) References Cited

U.S. PATENT DOCUMENTS

| | | | |
|---|---|---|---|
| 3,256,033 A | 6/1966 | Adams et al. | |
| 3,330,523 A | 7/1967 | Nichols | |
| 6,557,919 B2 * | 5/2003 | Suga | B60N 2/062 |
| | | | 296/65.07 |
| 7,063,368 B2 * | 6/2006 | Kayumi | B60N 2/01583 |
| | | | 296/65.05 |
| 7,780,230 B2 * | 8/2010 | Serber | B60N 2/0745 |
| | | | 297/216.1 |

(Continued)

OTHER PUBLICATIONS

Extended European Search Report dated Feb. 4, 2016 in European Application No. 151862192.3.

*Primary Examiner* — David R Dunn
*Assistant Examiner* — Tania Abraham
(74) *Attorney, Agent, or Firm* — Snell & Wilmer L.L.P.

(57) ABSTRACT

In various embodiments, a drive system with a motor rotary actuator driven linkage and an override system is provided. The override system may be a manually actuated override system that, in response to a power loss or outage, is configured to disengage one or more links of drive system 100 from the electric motor rotary actuator, allowing the disengaged link to be moved and/or repositioned. Moreover, drive system 100 and, more specifically, the override system may be configured to restore normal operation to the disengaged link in response to power being restored (i.e., by reengaging the link).

15 Claims, 6 Drawing Sheets

(56) References Cited

U.S. PATENT DOCUMENTS

| | | | |
|---|---|---|---|
| 8,020,894 B2* | 9/2011 | Marriott | B60R 22/321 |
| | | | 280/801.1 |
| 8,066,327 B2* | 11/2011 | Tomandl | B60N 2/0224 |
| | | | 297/326 |
| 8,585,146 B1* | 11/2013 | Giasson | B60N 2/0747 |
| | | | 297/344.1 |
| 8,746,773 B2* | 6/2014 | Bruck | B60N 2/22 |
| | | | 296/65.16 |
| 2005/0172559 A1* | 8/2005 | Hsieh | E05F 15/40 |
| | | | 49/140 |
| 2007/0157385 A1* | 7/2007 | Lemire | A61G 7/005 |
| | | | 5/600 |
| 2007/0157684 A1* | 7/2007 | Bogdanov | E05B 47/0692 |
| | | | 70/279.1 |
| 2010/0257906 A1* | 10/2010 | Sorensen | E05B 47/068 |
| | | | 70/91 |

\* cited by examiner

SYSTEM AND APPARATUS FOR DECOUPLING AN ELECTRO-MECHANICAL ACTUATOR FROM A PORTION OF A LINKAGE

FIELD

The present disclosure relates to manual operation of electrically actuated mechanisms, and more particularly, to systems and apparatuses for operating electrically actuated mechanisms during a power loss or outage.

BACKGROUND

Current electric rotary actuator driven mechanisms may use rigid linkages. During a power outage or loss, a rotary actuator that is not equipped with an integral decoupling system may be incapable of being back-driven. This limitation on operating may prevent the mechanism driven by the rotary actuator from being returned to a stowed position until power can be restored.

SUMMARY

In various embodiments, a drive system may comprise an electromechanical rotary actuator, a first link, a second link, a third link and a toggle arm. The electromechanical rotary actuator may include an output shaft. The first link may be operatively coupled to the output shaft. The first link may be configured to actuate a first mechanism in response to being driven in a first direction. The second link may be operatively coupled to the first link via a pin. The second link may be configured to actuate a second mechanism in response to being driven in a second direction. The third link may be operatively coupled to the first link and the second link via the pin. The toggle arm may be pivotally coupled on the third link. The toggle arm may also be operatively coupled to the pin. The toggle arm may be configured to actuate the pin between an operating position and an override position in response to actuation input.

In various embodiments, an electro-mechanical seat may comprise a base, a first support, a second support, a rotary actuator, a first drive link, a second drive link, an override link, a pin, and an override arm. The first support may be pivotally coupled to the base. The second support pivotally may also be coupled to the base. The rotary actuator may be operatively coupled to the first support and the second support. The rotary actuator may be configured to move the first support and the second support in response to a first input. The rotary actuator may also be configured to move the base in response to a second input. The first drive link may be operatively coupled to the rotary actuator and the first support. The second drive link may be operatively coupled to the first drive link and the base. The override link may be configured to translate between a first position and a second position. The pin may be moveable between an operating position and an override position. When the pin is in the operating position, the first drive link, the second drive link and the override link may be coupled together when the pin is in the operating position. When the pin is in the override position, the second drive link and the override link may be disconnected from the first drive link. The override arm may be mounted on the override link. The override arm may also be operatively coupled to the pin. The override arm may be configured to actuate the pin between the operating position and the override position.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice these embodiments, it should be understood that other embodiments may be realized and that logical changes and adaptations in design and construction may be made in accordance with the present disclosure and the teachings herein. Thus, the detailed description herein is presented for purposes of illustration only and not for providing limitations on the scope of the disclosure. For example, the steps recited in any of the methods or process descriptions may be executed in any order and are not limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Moreover, surface shading lines may be used throughout the figures to denote different parts but not necessarily to denote the same or different materials.

In various embodiments, electric motor rotary actuators may be employed to actuate mechanisms based on user inputs. These electric motor rotary actuators may be connected to various components in a system or mechanism with rigid linkages. For example, aircraft passenger seats, robotic arms, and/or other suitable systems or mechanisms may employ electric motor rotary actuators without integral decoupling systems. In the event of a power outage, systems or mechanisms may need to be overridden, adjusted and/or repositioned to a stowed position. Moreover, when power is restored, the override system should adjust to restore normal operation of the system or mechanism.

Figure 1:
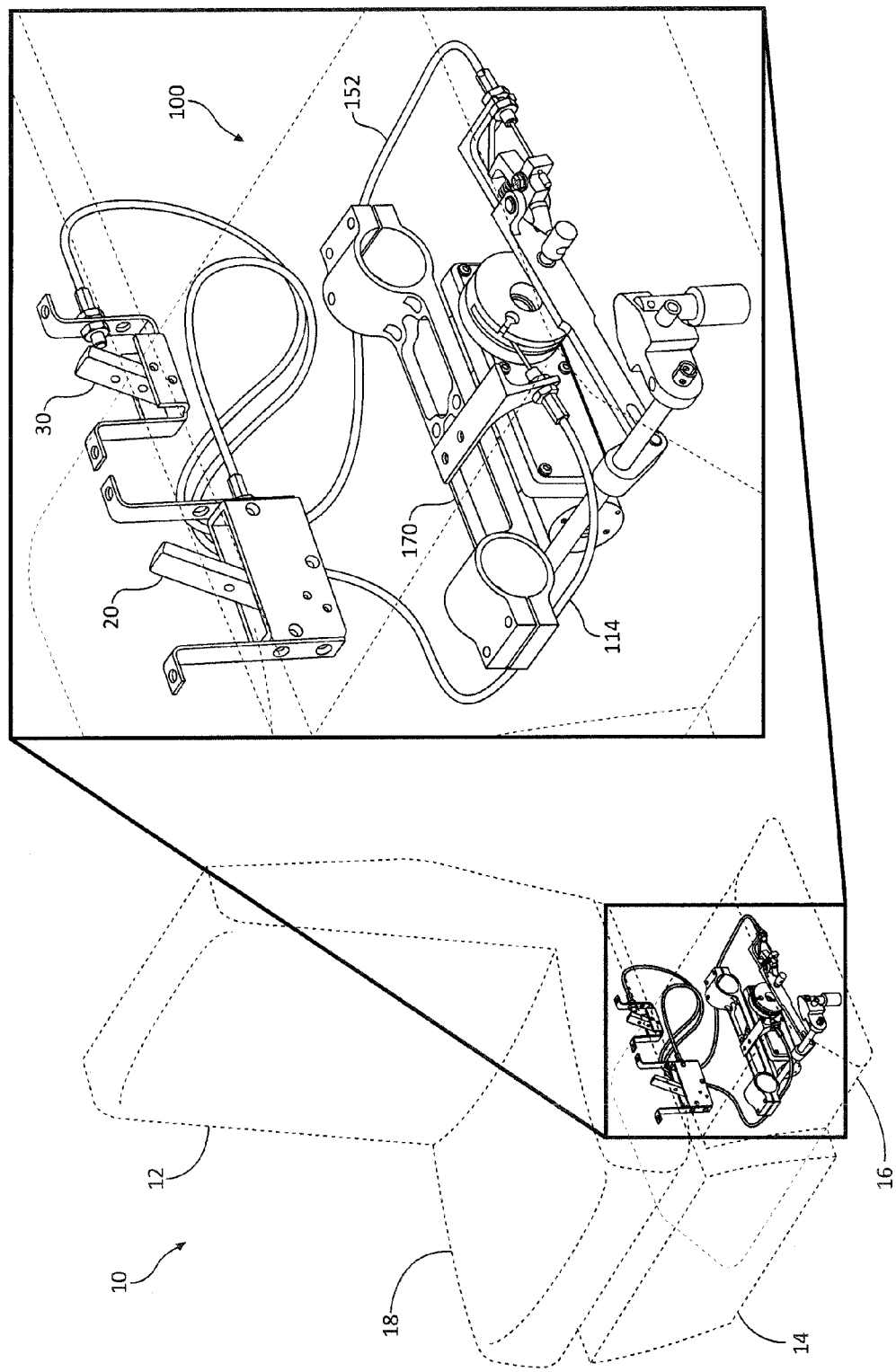
FIG. 1 illustrates a perspective view of a chair including a detailed perspective of an exemplary drive system including an override mechanism, in accordance with various embodiments.

In various embodiments and with reference to FIG. 1, drive system 100 may be any suitable electric motor rotary actuator driven linkage and/or system including an override system. The override system may be a manually actuated override system that, in response to a power loss or outage, is configured to disengage one or more links of drive system 100 from the electric motor rotary actuator, allowing the disengaged link to be moved and/or repositioned. Moreover, drive system 100 and, more specifically, the override system may be configured to restore normal operation to the disengaged link in response to power being restored (i.e., by reengaging the link). While described herein in the context of a seat 10, it should be understood that drive system 100 may be adapted and/or employed in any suitable mechanism including, for example, a robotic arm, pulling a locking pin out of a track, operating an track and swivel feature on a vehicle seat (e.g., an aircraft seat, a train seat, an automobile seat and the like) and/or the like.

In various embodiments, drive system 100 may be configured to actuate one or more portions of a seat 10. Seat 10 may comprise a base 16, a second support 18, and one or more supports such as, for example, a first support 12, a second support 18, and/or the like. These supports may be coupled to second support 18 and/or base 16. Drive system 100 may be mountable on base 16 and may be configured to drive first support 12, second support 18, and/or any other suitable movable mechanism of seat 10.

In various embodiments, drive system 100 and more specifically housing 170 may be operatively coupled to and/or mounted on base 16 of seat 10. Drive system 100 may be configured to receive electronic inputs from a user via any suitable user interface. For example, seat 10 may be configured with buttons or switches that allow a user to recline and/or actuate certain portions of seat 10 such as, for example, first support 12, second support 14, and/or the like. These inputs may allow a user to actuate seat 10 from a stowed position to a deployed position (e.g., in response to operating a track and swivel feature and/or a floor tracking feature).

In various embodiments, drive system 100 may also be operatively coupled to and/or be configured to receive manual inputs from a first lever 20 (e.g., a first handle), second lever 30 (e.g., a second handle), and/or any other suitable manual input. First lever 20 may be operatively coupled to a first cable 114 of drive system 100. First cable 114 may be configured to provide an input to one or more components of drive system 100. Similarly, second lever 30 may be operatively coupled to second cable 152. Second cable 152 may also be configured to provide an input to one or more components of drive system 100.

Figure 2A:
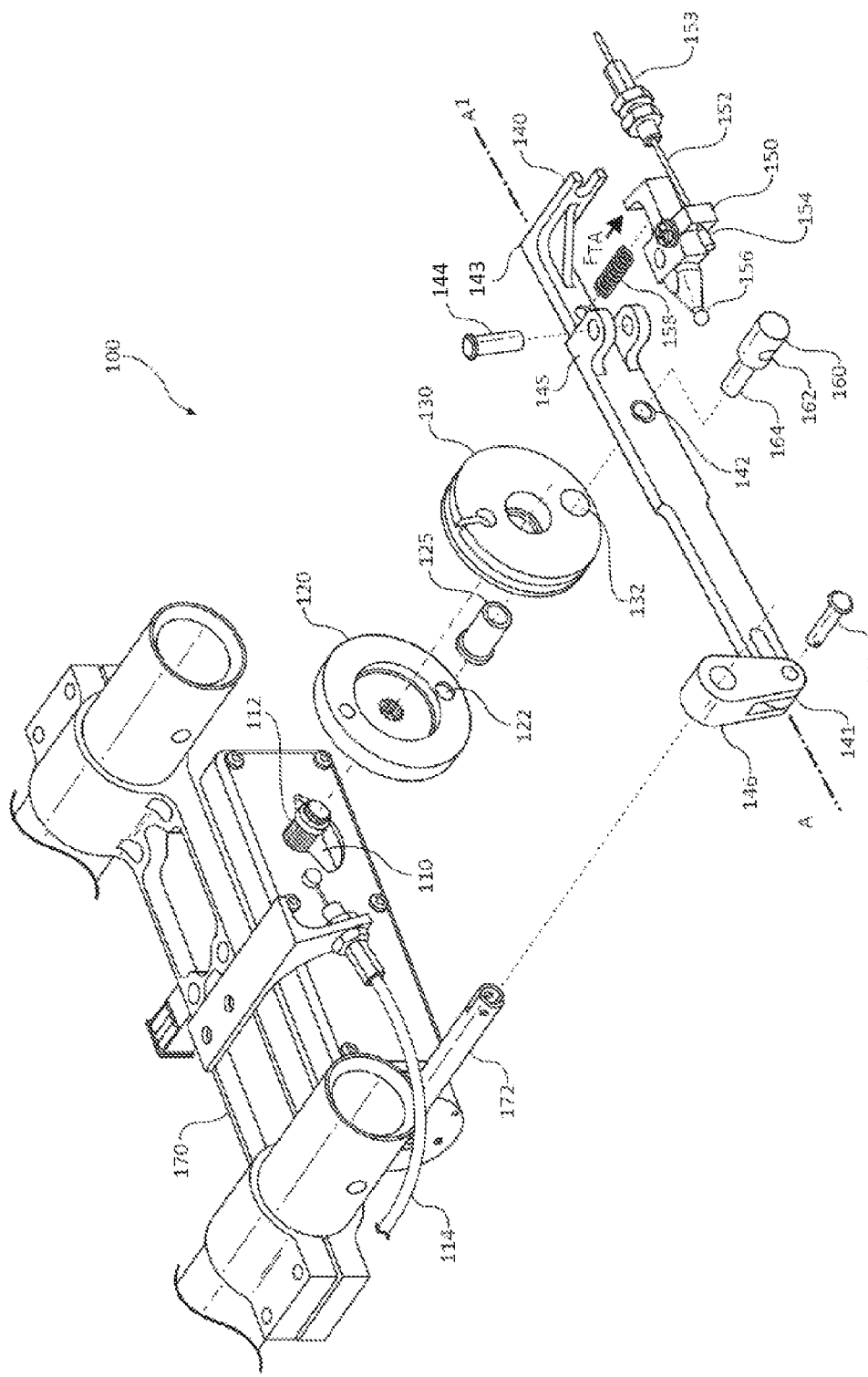
FIG. 2A illustrates an exploded perspective view of an exemplary drive system including an override mechanism, in accordance with various embodiments.
Figure 2B:
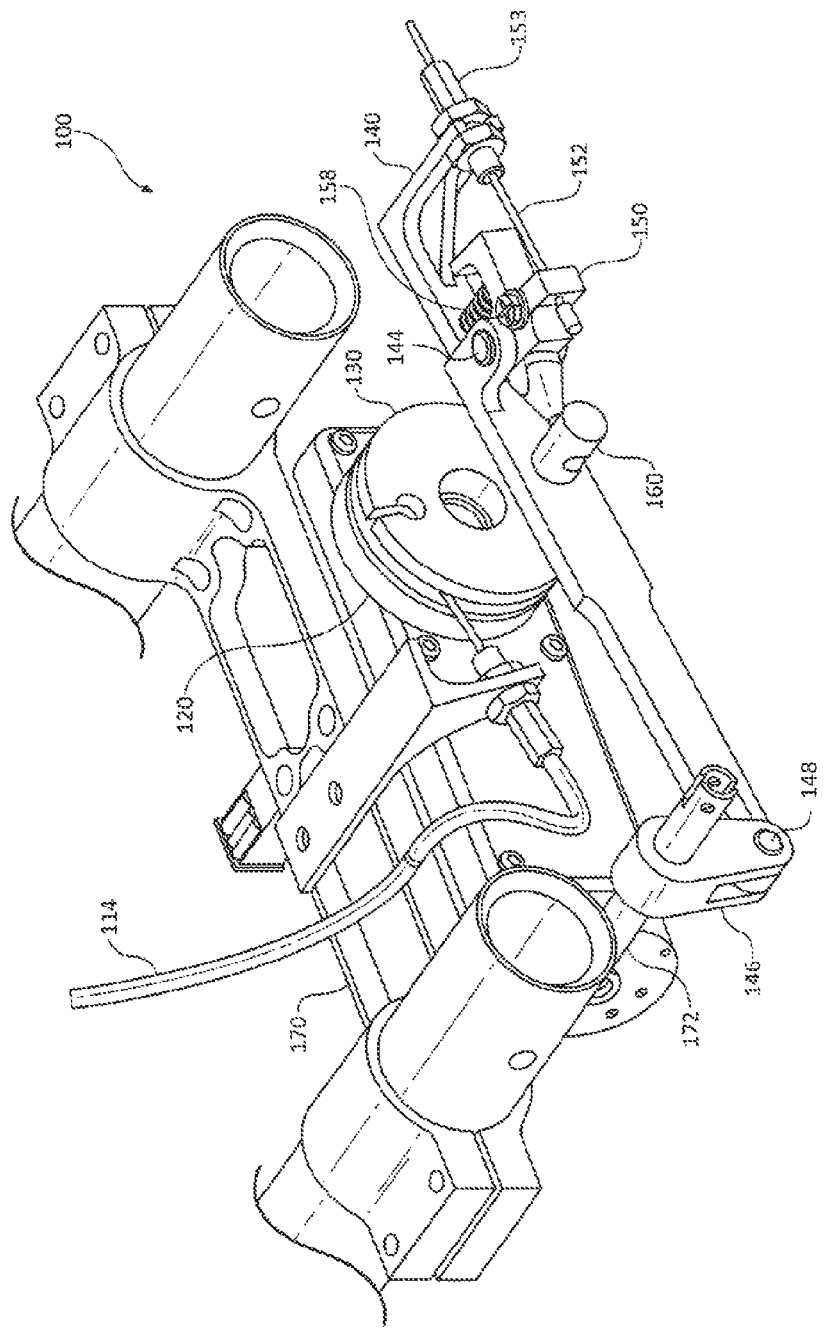
FIG. 2B illustrates a perspective view of an exemplary drive system including an override mechanism, in accordance with various embodiments.

In various embodiments and with reference to FIGS. 2A-2B, drive system 100 may comprise an electric motor rotary actuator 110, a first link 120 (e.g., a first drive link), a second link 130 (e.g., a second drive link), a third link 140 (e.g., an override link), a toggle arm 150, a pin 160, and a housing 170. Electric motor rotary actuator 110 may be mounted to housing 170. Moreover, electric motor rotary actuator 110 may be configured to receive inputs and power from any suitable system. Electric motor rotary actuator 110 may comprise an output shaft 112. Output shaft 112 may be any suitable output shaft including, for example, a spline shaft.

In various embodiments, electric motor rotary actuator 110 may be configured to engage first link 120. First link 120 may be any suitable link capable of being driven by electric motor rotary actuator 110 by, for example, output shaft 112. First link 120 may also actuate and/or move any suitable mechanical mechanism. For example, first link 120 may be coupled to second link 130. First link 120 and second link 130 may also be coupled to third link 140.

In various embodiments, first link 120 may comprise a first hole 122. Similarly second link 130 may comprise a second hole 132, and third link 140 may comprise a third hole 142. Second hole 132 of second link 130 may be configured to receive a sleeve and/or a coupler 125. Coupler 125 may pass through and sleeve second hole 132 and third hold 142. First link 120, second link 130, and third link 140 may all be coupled to one another via pin 160. Pin 160 may comprise an engagement head 162 and a through shaft 164. At least a portion of pin 160 may pass through third hole 142 and second hole 132 and pass into first hole 122, operatively coupling first link 120, second link 130, and third link 140. In this regard, through shaft 164 may be configured to pass through third hole 142 and second hole 132, and pass into first hole 122.

In various embodiments, third link 140 may comprise a toggle arm 150. Toggle arm 150 may be configured to actuate pin 160. More specifically, toggle arm 150 may comprise a ball 156. Ball 156 may engage and/or be retained in engagement head 162.

In various embodiments, toggle arm 150 may be pivotally coupled to third link 140. Third link 140 may comprise a bracket 145. Bracket 145 may comprise one or more through holes. The through holes may be configured to receive a pivot shaft 144. Toggle arm 150 may also comprise a through hole that is capable of receiving and allowing pivot shaft 144 to pass through toggle arm 150 and be retained in bracket 145. In this regard, toggle arm 150 may pivotally couple to third link 140 about pivot shaft 144. The pivoting engagement may also allow toggle arm 150 to engaging pin 160 via a connection between ball 156 of toggle arm 150 engaging and being movably coupled to engagement head 162 of pin 160.

In various embodiments, toggle arm 150 may be installed on third link 140 in a biased configuration (e.g., in a first position, an operating position, a powered operation position, and/or the like). Toggle arm 150 may be biased by spring 158. Spring 158 may be configured to exert a biasing force $F_{TA}$. In this regard, toggle arm 150 generally retains and biases pin 160 to active engagement of first link 120, second link 130, and third link 140. This configuration allows electric motor rotary actuator 110 to drive first link 120, second link 130, and/or third link 140 based on user inputs and/or commands to actuate drive system 100. Toggle arm 150 may also be coupled to second lever 30, as shown in FIG. 1 via second cable 152. Second cable 152 may be operatively coupled to and retained on toggle arm 150 via cable connection 154. Moreover, the length of second cable 152 and the force required to engage toggle arm 150 may be adjusted by cable guide 153.

In various embodiments, third link 140 may be operatively coupled to second link 130. During normal operation third link 140 may also be operatively coupled to first link 120 via second link 130. Third link 140 may comprise a first end 141 and a second end 143. First end 141 may couple to support 172 via a joint 146. Joint 146 may be operatively couple to third link 140 via a retaining pin 148. Moreover, third link 140 may pivotally move about retaining pin 148. Joint 146 may also pivot about support 172. The engagement of first end 141 of third link 140 may constrain the movement of third link 140 along an axis A-A'. Third link 140 and/or the movement associated with third link 140 may be limited to one direction. In this regard, third link 140 may have one degree of freedom.

Figure 3A:
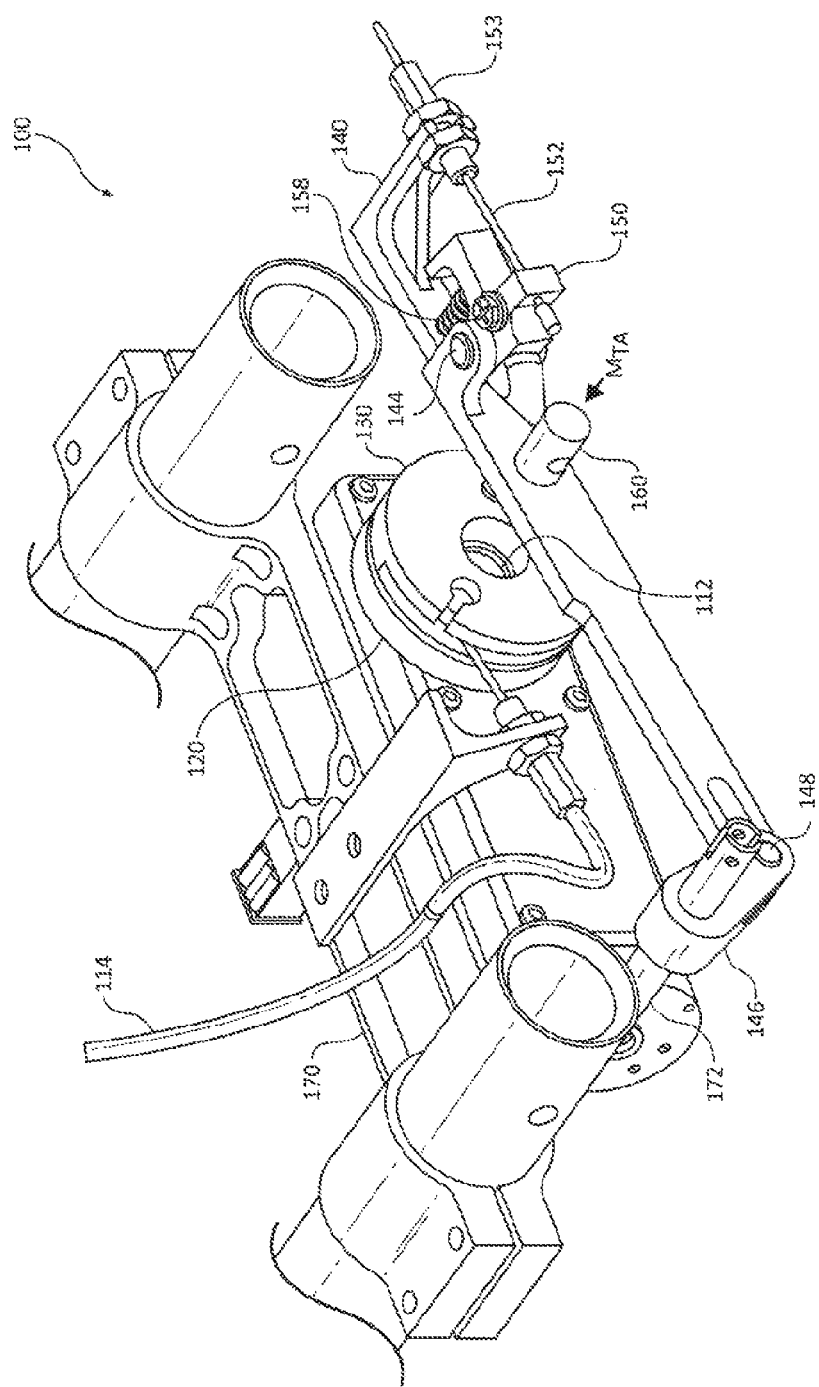
FIG. 3A illustrates a perspective view of an exemplary drive system including an override mechanism in an operating position, in accordance with various embodiments.
Figure 3B:
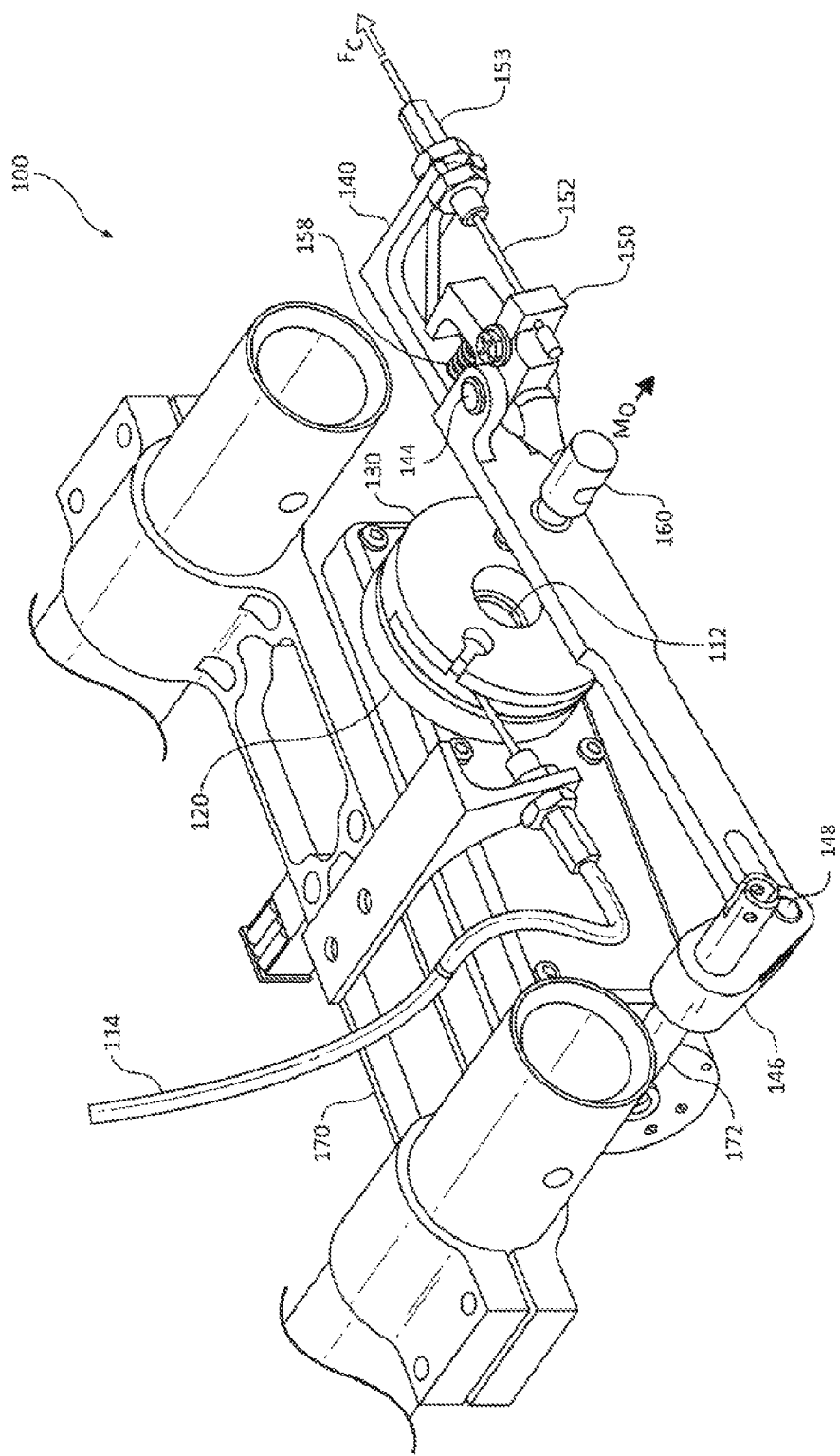
FIG. 3B illustrates a perspective view of an exemplary drive system including an override mechanism in a first override position, in accordance with various embodiments.
Figure 3C:
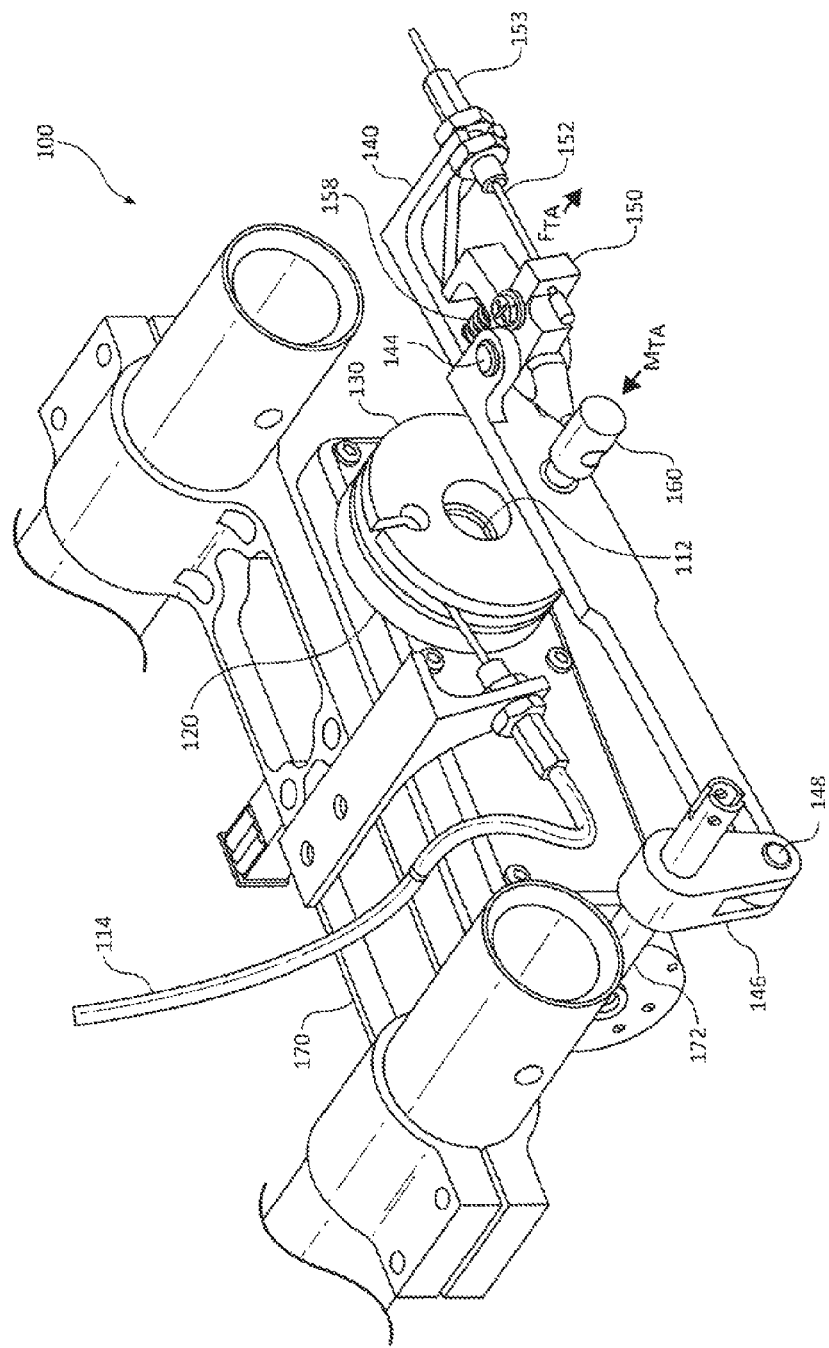
FIG. 3C illustrates a perspective view of an exemplary drive system including an override mechanism in a second override position, in accordance with various embodiments.

In various embodiments and with reference to FIGS. 3A-3C, during operation and in response to a power loss condition and/or power outage, an electromechanically driven mechanism may need to be actuated from a first position to a second position (e.g., from a deployed position to a stowed position). To actuate drive system 100, a user may actuate or provide an input to first lever 20 and/or second lever 30, as shown in FIG. 1, causing first cable 114 or second cable 152 to retract, respectively. The input to second lever 30 may be a force $F_C$ causing the second cable 152 to retract and to actuate toggle arm 150. Toggle arm 150 may cause pin 160 to move in a direction $M_O$ outwardly away from first link 120, as shown in FIG. 3B. The motion of pin 160 may decouple second link 130 from first link 120. As a result, the motion of pin 160 may also decouple second link 130 from electric motor rotary actuator 110 and/or output shaft 112. A user may continue to provide a force $F_C$ to third link 140 via second lever 30 after pin 160 has been disengaged from first link 120. This continued force $F_C$ may cause second link 130 and/or third link 140 to actuate from a first or deployed position $P_1$ as shown in FIGS. 3A and 3B to a second or stowed position $P_2$ as shown in FIG. 3C.

In various embodiments and as discussed herein, toggle arm 150 may be biased inward in the direction of $M_{TA}$, as shown in FIG. 3A. In this regard, spring 158 may exert force $F_{TA}$ on pin 160 via toggle arm 150. In response to power being restored, first link 120 may be driven by electric motor rotary actuator 110 to the stowed position. This may allow pin 160 to engage first hole 122 of first link 120. In response to pin 160 engaging first hole 122, first link 120, second link 130, and third link 140, may be coupled to one another. Moreover, drive system 100 may be operational and/or be returned to the stowed position and may be re-deployable by a user.

In various embodiments, the systems and apparatuses described herein may be used in any suitable electromechanical system that employs an electric motor rotary actuator. These systems and apparatuses may be configured to mechanically decouple linkages from an electric motor rotary actuator during or in response to a power loss and/or power outage. Moreover, the systems and apparatuses described herein may provide a more cost effective and efficient solution to rotary actuators that have built-in decoupling systems.

Benefits and advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, such benefits, advantages, and any elements that may cause any benefit or advantage to occur or become more pronounced are not to be construed as critical, required, or essential features or elements of the disclosure. Reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A drive system, comprising:
   an electromechanical rotary actuator including an output shaft configured to rotate in at least one of a first rotational direction and a second rotational direction;
   a first link operatively coupled to the output shaft and configured to actuate a first mechanism in response to being driven in at least one of the first rotational direction and the second rotational direction;
   a second link operatively coupled to the first link via a pin and configured to actuate a second mechanism in response to being driven in at least one of the first rotational direction and the second rotational direction;
   a third link operatively coupled to the first link and the second link via the pin; and
   a toggle arm pivotally coupled on the third link, the toggle arm operatively coupled to the pin and configured to actuate the pin between an operating position and an override position in response to an actuation input,
   wherein the first rotational direction and the second rotational direction are in opposite rotational directions.

2. The drive system of claim 1, wherein the pin couples the first link, the second link, and the third link together in the operating position.

3. The drive system of claim 2, wherein the toggle arm is biased to the operating position by a spring.

4. The drive system of claim 1, wherein the override position disconnects the second link and the third link from the first link.

5. The drive system of claim 1, wherein the drive system is deployed in an electro-mechanically actuated seat.

6. The drive system of claim 1, wherein the actuation input is provided via a cable.

7. The drive system of claim 6, wherein the cable is operatively coupled to a handle.

8. The drive system of claim 1, wherein the third link comprises a first end and a second end.

9. The drive system of claim 8, wherein the first end is pivotally connected to a support.

10. The drive system of claim 1, wherein the third link translates from a first position to a second position in response to the actuation input and the toggle arm moving from the operating position to the override position.

11. An electro-mechanical seat, comprising:
a base,
a first support pivotally coupled to the base;
a second support pivotally coupled to the base;
a rotary actuator operatively coupled to the first support and the second support;
a first drive link operatively coupled to the rotary actuator, the first support, and the second support;
a second drive link operatively coupled to the first drive link and the base;
an override link configured to translate between a first position and a second position;
a pin moveable between an operating position and an override position,
wherein the first drive link, the second drive link and the override link are coupled together when the pin is in the operating position, and
wherein the second drive link and the override link are disconnected from the first drive link when the pin is in the override position;
an override arm mounted on the override link and operatively coupled to the pin, the override arm configured to actuate the pin between the operating position and the override position.

12. The electro-mechanical seat of claim 11, wherein the override arm is biased with a spring.

13. The electro-mechanical seat of claim 11, wherein the override arm is actuatable by a cable.

14. The electro-mechanical seat of claim 13, wherein the override link is actuatable by the cable and in response to the pin being in the override position.

15. The electro-mechanical seat of claim 11, wherein the pin is actuated to the override position in response to a loss of electrical power.

\* \* \* \* \*